United States Patent
Lang et al.

[11] Patent Number: 5,520,411
[45] Date of Patent: May 28, 1996

[54] COVER MOUNTING FOR AN AIRBAG ASSEMBLY

[75] Inventors: Gregory J. Lang; F. Paul Leonelli, both of Ogden; Wael S. Elgadah, North Ogden, all of Utah

[73] Assignee: Morton International, Inc., Chicago, Ill.

[21] Appl. No.: 409,272

[22] Filed: Mar. 23, 1995

[51] Int. Cl.⁶ ................................................ B60R 21/20
[52] U.S. Cl. ...................... 280/728.3; 403/282; 403/283
[58] Field of Search .............. 280/728.3, 728.2, 280/731, 732, 730.1, 728.1; 403/282, 283, 285, 345, 375; 220/309, 324, 621

[56] References Cited

U.S. PATENT DOCUMENTS

| | | | |
|---|---|---|---|
| 4,842,351 | 6/1989 | Rock et al. | 403/283 |
| 5,031,930 | 7/1991 | Sato | 280/732 |
| 5,066,037 | 11/1991 | Castrigno et al. | 280/728.3 |
| 5,167,427 | 12/1992 | Baba | 280/728.3 |
| 5,186,490 | 2/1993 | Adams et al. | 280/731 |
| 5,280,946 | 1/1994 | Adams et al. | 280/728.3 |
| 5,303,951 | 4/1994 | Goestenkors et al. | 280/728.3 |
| 5,312,129 | 5/1994 | Ogawa | 280/728.2 |
| 5,335,936 | 8/1994 | Faigle et al. | 280/728.3 |
| 5,338,060 | 8/1994 | Soderquist | 280/728.3 |
| 5,342,086 | 8/1994 | Harris et al. | 280/728.3 |
| 5,348,339 | 9/1994 | Turner | 280/728.3 |
| 5,427,407 | 6/1995 | Yokote | 280/728.2 |
| 5,454,586 | 10/1995 | Rogerson | 280/728.3 |
| 5,470,101 | 11/1995 | Ennis | 280/731 |

FOREIGN PATENT DOCUMENTS

| | | | |
|---|---|---|---|
| 1-160756 | 6/1989 | Japan | 280/728.2 |
| 4-55148 | 2/1992 | Japan | 280/728.2 |
| 4-169356 | 6/1992 | Japan | 280/728.2 |

*Primary Examiner*—Eric D. Culbreth
*Assistant Examiner*—Peter C. English
*Attorney, Agent, or Firm*—George W. Rauchfuss, Jr.; Gerald K. White

[57] ABSTRACT

An airbag module cover having downwardly extending sidewalls is mounted in the base of an airbag housing. The base has downwardly extending peripheral legs thereon having inner and outer walls forming a generally U- or V-shaped integral groove at the lower extremity thereof. The legs have locking tabs positioned above the grooves which tabs are adapted to protrude into or through the sidewalls of the cover. When the sidewalls of the cover are locked in the grooves of the legs, the inner and outer walls of the legs provide lateral support for the sidewalls for preventing separation of the cover sidewalls from the housing during airbag deployment.

6 Claims, 3 Drawing Sheets

5,520,411

COVER MOUNTING FOR AN AIRBAG ASSEMBLY

FIELD OF THE INVENTION

This invention relates to an airbag module assembly, and more particularly to a module cover attachment to an airbag module housing containing an inflator and a collapsed airbag which prevents the cover from separating from the housing during deployment of the airbag.

BACKGROUND OF THE INVENTION

Automotive restraint systems, referred to as airbag module assemblies, are installed to protect the driver and other occupants from injury in the event of a collision. The airbag, activated by an ignitor, is rapidly filled with gas generated by the ignitor and is designed to inflate in approximately 50 milliseconds or less. The uninflated, folded airbag is mounted within a housing having a decorative cover which is designed to open for deployment of the inflating airbag.

Extreme pressures are generated by the explosive nature of the inflating airbag behind the cover, creating a difficult problem in installing the cover to the airbag housing in such a manner so as to prevent the cover from separating from the housing or breaking into pieces to thereby prevent those from becoming dangerous projectiles with respect to the vehicle occupants.

The prior art has resorted to a number of approaches for handling the aforesaid separation problem including anchoring the sidewalls of the cover to the housing by rivets, brackets or other structure. In one module cover attachment method, an outwardly and downwardly projecting lip on the housing must be inserted into a locking groove located on the inside of the vertical walls or locking blocks on the vertical wall of the cover. Assembling such a cover can be difficult as well as time consuming because the housing lip must be inserted in the locking groove on the inside of the cover. Such an assembly involves a relatively difficult process of bending and simultaneously pushing on the cover in order to spread apart the locking groove to insert the housing lip into the locking groove which is smaller in size than the lip. This attachment means is meant to prevent the cover from translating and/or rotating outward during deployment of the airbag since such deployment can generate pressures inside the cover of about 100 psi or more. The blocks of the vertical walls are meant to prevent the locking blocks from becoming disengaged from the lip of the airbag housing. However, experience has demonstrated that without further means to restrain the lower edge of the cover sidewall the cover groove can become disengaged from the housing lip. Therefore, additional retainer devices, such as brackets, rivets or the like have been installed in order to attempt to prevent separation of the lower edge of the cover sidewall from the housing from occurring on deployment of the airbag; otherwise, outward pressure against the cover sidewalls created by the inflating airbag will remove the housing lip from the groove and/or break the non-anchored lower ends of the sidewalls. In addition, the type of plastics which can be used for such a cover is limited and the molding thereof and removal of the cover from the mold is complicated because of the locking groove. Furthermore, a complicated mold design is required. Moreover, damage to the cover can occur quite often during removal of the cover from the mold and said removal undesirably requires hand removal.

SUMMARY OF THE INVENTION

Accordingly, it is an object of this invention to provide a new and improved structure for securing an airbag module cover on the housing of an airbag module assembly which greatly improves and simplifies the cover attachment process.

Another object of this invention is to provide a new and improved structure for attaching an airbag module cover to the housing of an airbag module assembly which increases the speed of assembly and reduces the cost of the airbag module by eliminating additional anchoring structure between the sidewalls of the cover and the housing.

Yet another object of this invention is to provide a new and improved structure for attaching an airbag module cover to the housing of an airbag module assembly which improves the moldability of the cover and allows for a greater selection of materials which can be used to mold the cover.

A still further object of this invention is to provide a new and improved structure for attaching an airbag module cover to the housing of an airbag assembly which attaches the cover to the housing in a more secure manner so as to resist detachment of the cover sidewalls from the housing and at the same time eliminating the need for additional retaining brackets or rivets or the like.

It is a still further additional object of this invention to provide a new and improved structure for attaching an airbag module cover to the housing of an airbag module assembly which improves the speed of assembly yet provides a ready means for removal of the cover from the housing such as when desired to do so for repair of a membrane horn switch or the like.

In carrying out this invention in one illustrative embodiment thereof, the improvement is provided in an airbag module assembly having an airbag housing member containing an inflator coupled to a collapsed airbag for inflating the airbag and a module cover for closing the housing, the cover being adapted to be opened by an inflating airbag, wherein the cover has an upper surface openable for deployment of the airbag and downwardly extending cover sidewalls with a plurality of spaced retention openings in spaced alignment from the distal ends of the cover sidewalls. The airbag housing has a generally planar base with a plurality of spaced, downwardly extending legs at the peripheral edge or edges of said base, said legs each having an inner wall and an outer wall connected by a groove on the lower extremity of said inner and outer walls for receiving and positioning the lower edge of the cover sidewalls therein when the cover is mounted in the housing. A plurality of attachment means or tabs are unitary with and positioned on said legs above the grooves, the attachment means being adapted to align with and extend into the spaced openings in the sidewalls of the cover or to pierce the cover when the cover is mounted to the base of the housing thereby locking the lower portion of the cover sidewalls in the grooves of the base of the airbag housing between the inner and outer walls of the legs of the housing.

BRIEF DESCRIPTION OF THE DRAWINGS

The invention together with further objects, aspects, features and advantages thereof will be more clearly understood from the following description taken in connection with the accompanying drawings in which like elements bear the same reference numerals throughout the various views.

DESCRIPTION OF THE PREFERRED EMBODIMENTS

Figure 1:
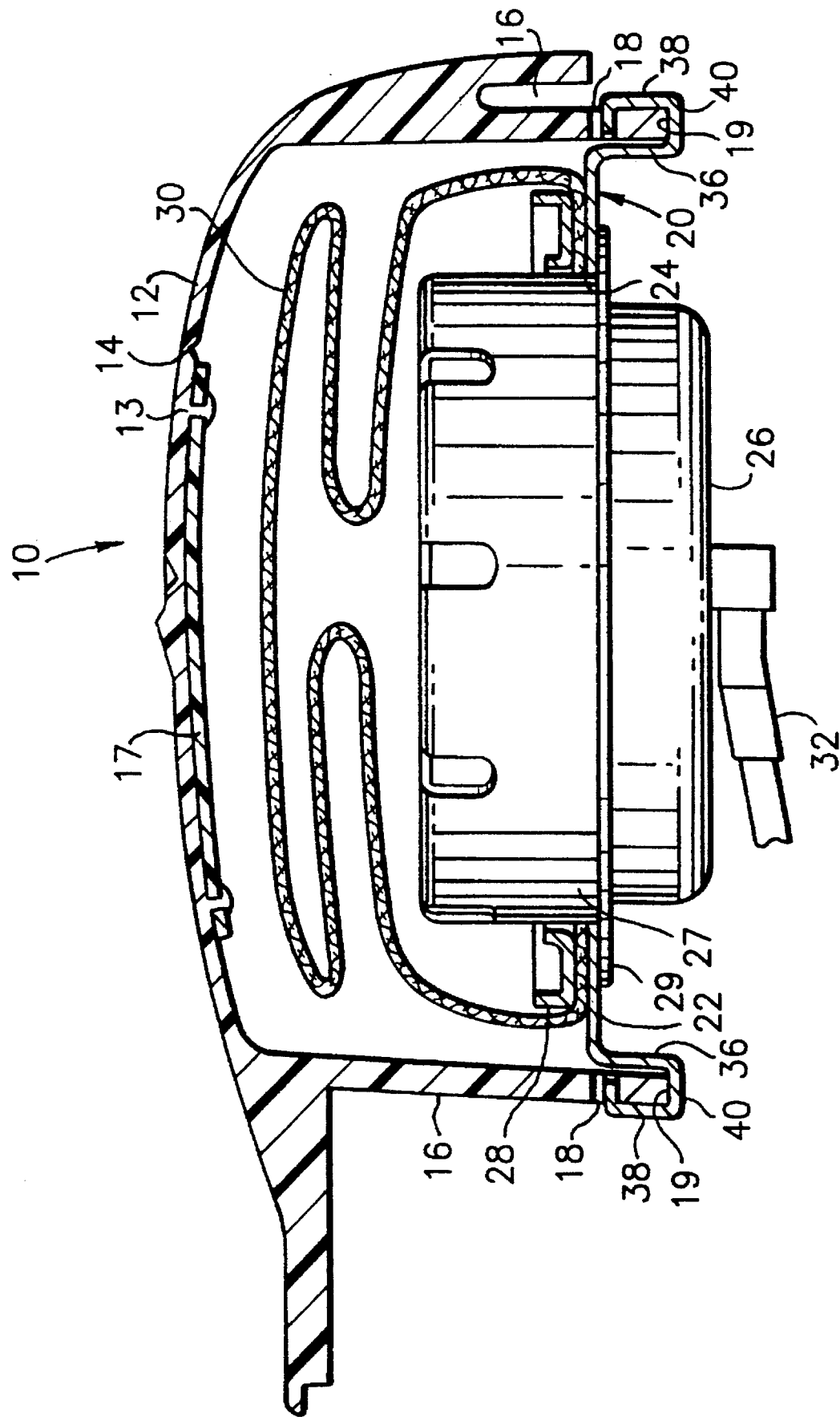
FIG. 1 is an elevational view, partly in section of an airbag module assembly showing one embodiment of the module cover to airbag housing attachment in accordance with the present invention.

Referring now to FIG. 1, an airbag module assembly, referred to generally with the reference numeral 10, is shown. The airbag module assembly includes a decorative module cover 12 having an upper, generally decorative surface 13 with downwardly extending sidewalls 16. It will be appreciated that if the cover surface 13 is essentially circular in nature sidewalls 16 may represent an essentially circular sidewall. Openings 18 are provided in the sidewalls 16. The openings 18 are spaced and aligned from the lower distal ends 19 of the sidewalls 16. A membrane horn switch 17 may be mounted on the inside or back side of the cover 12. Module cover 12 is generally provided with one or more tear lines 14 for providing opening of the cover 12 upon deployment of an airbag.

An airbag housing, referred to generally with the reference numeral 20, has a base 22 with a central opening 24 (see FIG. 2) through which an upper portion 27 of an inflator 26 projects. The inflator 26 is fixedly attached or mounted to the housing base 22 by any suitable manner such as by attachment of a circumferential inflator flange 29 to the base. A collapsed or folded cushion or airbag 30 is retained on the base 22 surrounding the inflator 26 by an airbag mounting member or retainer ring 28 fixedly attached to the base by any suitable means (not shown). An electrical connector 32 is coupled to the inflator 26 which supplies the ignition signal for activating the inflator to inflate and deploy airbag 30.

Figure 2:
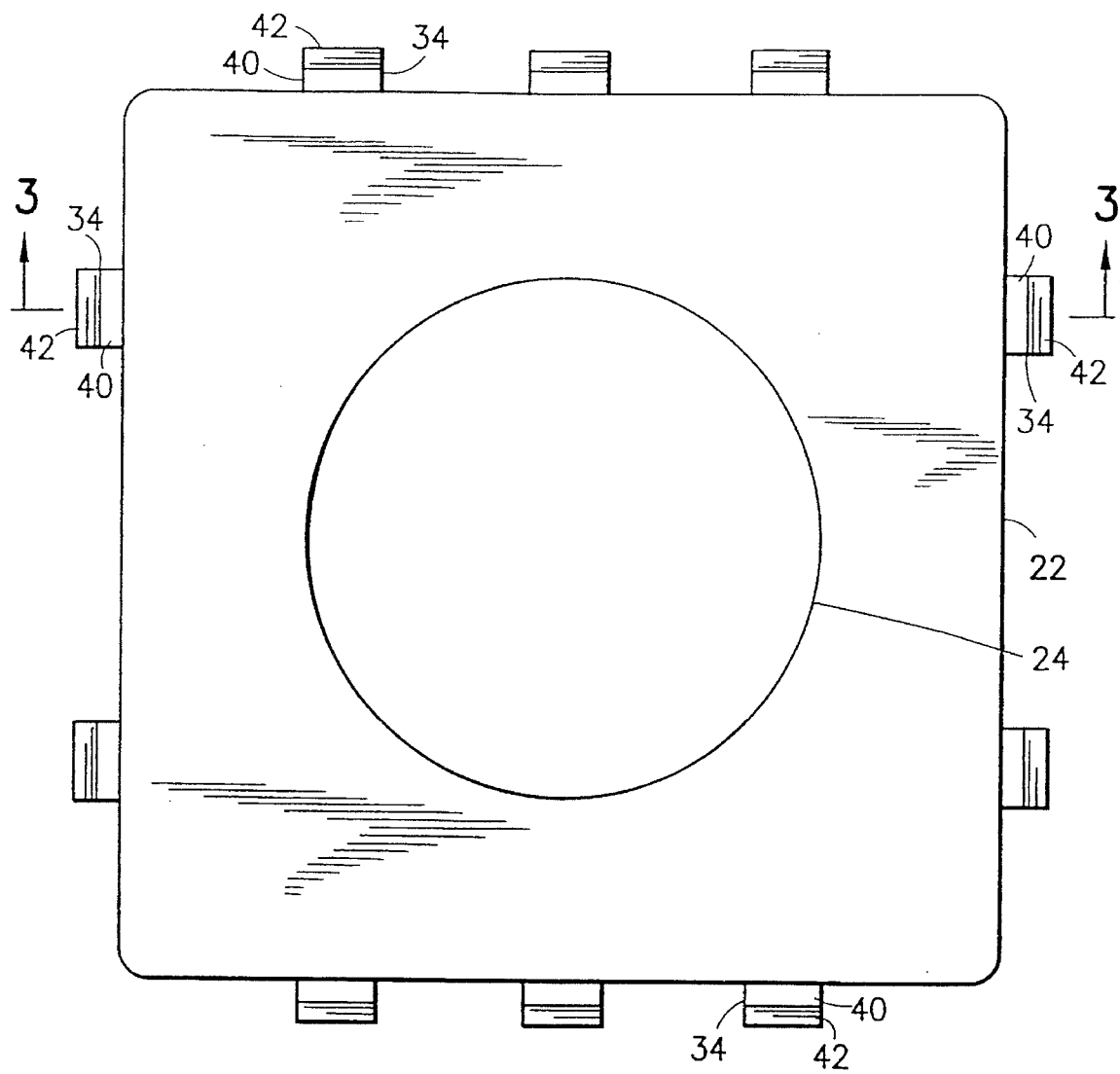
FIG. 2 is a top view of the base and legs of an airbag housing.
Figure 3:
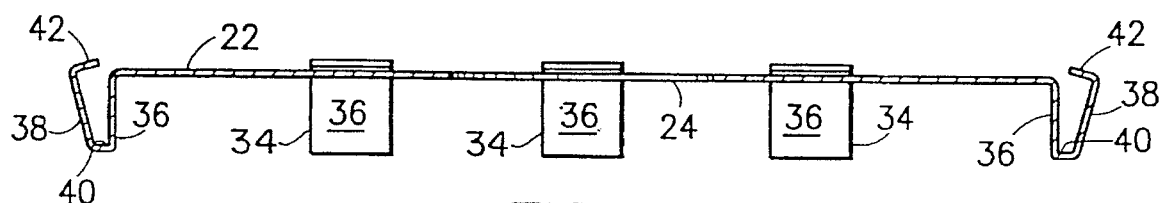
FIG. 3 is a cross-sectional view along line 3—3 in FIG. 2.

As will best be seen in FIGS. 2, and 3, the base 22 of the airbag housing 20 has a plurality of peripherally spaced, downwardly extending legs 34 each having an inner wall 36 and an outer wall 38 with a U- or V-shaped groove 40 formed between and connecting the inner and outer walls 36 and 38 at the lower extremity of the legs 34. The distal end of outer wall 38 is terminated in a locking tab or flange 42 extending inwardly toward the base 22.

The module cover 10 is installed on the airbag housing 20 by placing the cover over the housing, to which the inflator 26 and airbag 30 have been attached, and inserting the lower edges 19 of the sidewalls 16 of the cover into the legs 34 on the base 22. When so inserted, the distal ends 19 of the sidewalls 16 come to rest in the grooves 40 on the lower extremity of the legs 34. The sidewalls 16 positioned in the grooves 40 are flanked by inner and outer walls 36 and 38, respectively, of the legs 34, thereby providing lateral support to enable the sidewalls to resist the lateral forces generated during deployment of the airbag 30. The locking tabs 42 are then deformed or biased inwardly into the openings 18 in the sidewalls 16 of the cover 12 to lockingly attach the cover 12 to the housing 20 as shown in FIG. 1.

With locking tabs 42 positioned in opening 18 of the sidewalls 16, the sidewalls 16 are retained in grooves 40 between inner and outer walls 36 and 38 of legs 34 so that either lateral or longitudinal forces generated during the deployment of the airbag 30 do not displace sidewalls 16 from grooves 40 or disengage openings 18 from locking tabs 42.

Figure 4A:
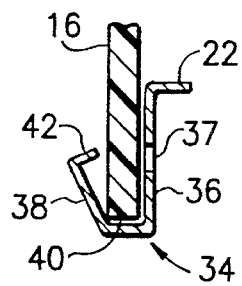
FIGS. 4A and 4B illustrate an alternative embodiment in which a slot is provided in the legs of the housing and the cover is pierced with a tab on the housing when crimped.
Figure 4B:
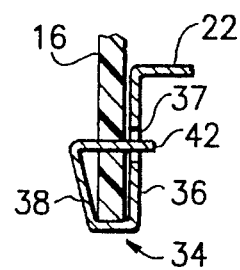

In the embodiment of FIGS. 4A and 4B, a slot 37 is provided in inner wall 36 of the leg 34. When the tab 42 is crimped, the tab 42 pierces the sidewall 16 of the cover 42 and extends through the slot 37 and nestles in the slot 37 which strengthens the locking tab in its locked position. The embodiment of FIG. 1 may also eliminate the retention opening in the cover with the tab 42 piercing the cover when crimped. If desired, the embodiment of FIGS. 4A and 4B may include a slot opening in the cover similar to slot opening 18 of FIG. 1.

The aforesaid mounting avoids the necessity in the prior art of fitting a housing lip into a locking groove on the inside of a module cover and then providing brackets or other types of retainers to prevent separation of the cover from the airbag housing.

Figure 5:
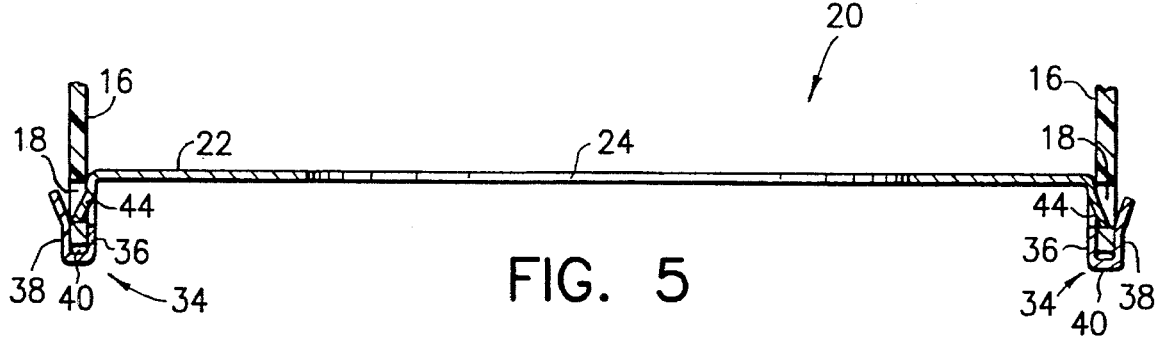
FIG. 5 is a cross-sectional view of another embodiment of the present invention showing the broken away module cover mounted in the base of the airbag housing.

In the embodiment shown in FIG. 5, the inner walls 36 have outwardly and generally downwardly extending locking tabs 44 thereon instead of the inwardly extending locking tabs 42 on the outer walls 38 of the legs 34. In this embodiment the assembly process is further simplified. The cover 12 is simply pushed into the legs 34 by an axial force on the cover causing the cover sidewalls to elastically deform slightly outwardly until the locking tabs 44 mate with and snap into the openings 18 in the sidewalls 16 of the cover 12. In this locked position of the cover 12 in the housing 20, the inner wall 36 and the outer wall 38 of the legs 34 flank the distal ends 19 of the sidewalls 16 providing lateral support therefor and accordingly eliminating the necessity for retainer brackets or other forms of additional support.

Figure 6A:
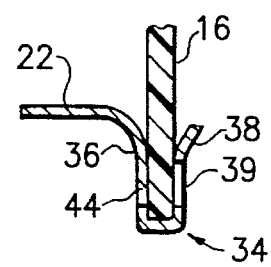
FIGS. 6A and 6B show another embodiment of FIG. 5 with a deformable tab and a slot in the: outer wall on the legs of the base.
Figure 6B:
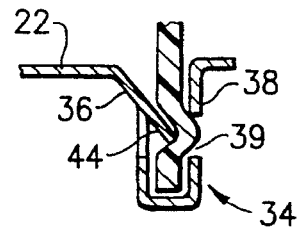

In the embodiment of FIGS. 6A and 6B, a slot 39 is provided in the outer wall 38 of the legs 34 opposite deformable tabs 44 in inner wall 36. When deformed, the deformable tabs 44 deforms the sidewalls 16 of the cover 12 into the slots 39, thereby retaining the cover 12 in the base 22.

Accordingly, the invention simplifies the assembling process, simplifies the cover molding process and eliminates the need for retainer brackets.

Since other modifications and changes varied to fit particular operating requirements and environments will be apparent to those skilled in the art, the invention is not considered limited to the examples chosen for purposes of disclosure and covers all modifications and changes which do not constitute departures from the true spirit and scope of this invention.

We claim:

1. In an improved airbag module assembly having an airbag housing containing an inflator coupled to a collapsed airbag for inflating said airbag and a module cover closing said housing, the improvement comprising:

said module cover having an upper surface and downwardly extending sidewalls terminating in distal ends;

said airbag housing having a base with a plurality of peripherally spaced, downwardly extending legs, said base having a central opening for receiving the inflator;

each of said legs having an inner wall and an outer wall connected by an integral groove located at the lower extremity of said inner and outer walls, said grooves receiving and positioning said sidewalls of said module cover therein between said inner and outer walls of said legs; and attachment means positioned above said groove on and unitary with each of said legs and comprising a flange on the distal end of each of said outer walls of said legs and projecting inwardly toward said inner walls of said legs, which flanges protrude into and through said module cover sidewalls locking said module cover sidewalls in said grooves of said base legs and between the inner and outer walls of said legs, and wherein said grooves are generally U-shaped.

2. In the improved airbag assembly as claimed in claim 1 wherein said downwardly extending sidewalls of said module cover have a plurality of spaced openings on said sidewalls positioned in spaced alignment from the distal ends of said sidewalls, said openings receiving said flanges.

3. In the improved airbag module assembly as claimed in claim 1 further comprising:

a slot in said inner wall of each said leg; and said flanges pierce through said sidewalls and align with and extend into said slots in said inner walls of said base.

4. An improved airbag housing for use in an airbag module assembly containing an inflator, an inflatable airbag and an airbag module cover having downwardly extending sidewalls terminating in distal ends, said improved airbag housing comprising:

a base having a central opening for receiving said inflator and retaining said inflatable airbag, a plurality of legs extending downwardly from the periphery of said base, each of said legs having an inner wall and an outer wall connected by an integral groove located at the lower extremity of said inner and outer walls, said grooves configured to receive and position the sidewalls of the module cover therein between said inner and outer walls of said legs, a plurality of attachment means positioned above said groove on and unitary with each of said legs and comprising a flange on the distal end of each of said outer walls of said legs and projecting inwardly toward said inner walls of said legs, which flanges align with and extend into and through the sidewalls of the module cover for locking said module cover sidewalls in said grooves of said base legs and between the inner and outer walls of said legs, wherein said grooves are generally U-shaped.

5. In an improved airbag module assembly having an airbag housing containing an inflator coupled to a collapsed airbag for inflating said airbag and a module cover closing said housing, the improvement comprising:

said module cover having an upper surface and downwardly extending sidewalls terminating in distal ends;

said airbag housing having a base with a plurality of peripherally spaced, downwardly extending legs, said base having a central opening for receiving the inflator;

each of said legs having an inner wall and an outer wall connected by an integral generally U-shaped groove located at the lower extremity of said inner and outer walls, said grooves receiving and positioning said sidewalls of said module cover therein between said inner and outer walls of said legs; and attachment means positioned above said groove on and unitary with each of said legs and comprising a deformable locking tab extending outwardly and downwardly from said inner wall of each said legs, which deformable locking tabs protrude into and deform a portion of said module cover sidewalls locking said module cover sidewalls in said grooves of said base legs and between the inner and outer walls of said legs.

6. In the improved airbag assembly as claimed in claim 5 wherein said outer wall of each of said legs has a slot opposite said deformable locking tab and said slots receive said portion of said sidewall deformed by said locking tab.

* * * * *

UNITED STATES PATENT AND TRADEMARK OFFICE
CERTIFICATE OF CORRECTION

PATENT NO. : 5,520,411
DATED : May 28, 1996
INVENTOR(S) : Lang et al.

It is certified that error appears in the above-indentified patent and that said Letters Patent is hereby corrected as shown below:

Col. 3, line 17, delete the colon (:) after "in the"

Col. 3, line 51, delete the comma (,) after "Figs. 2"

Col. 4, line 14, "42" should be "12" at its second appearance.

Signed and Sealed this

Eighth Day of April, 1997

Attest:

BRUCE LEHMAN

Attesting Officer      Commissioner of Patents and Trademarks